United States Patent [19]

Katsuyama et al.

[11] Patent Number: 4,861,130
[45] Date of Patent: Aug. 29, 1989

[54] OPTICAL MODULATING DEVICE UTILIZING POLARITON SUBSTANCE

[75] Inventors: Toshio Katsuyama, Hachioji; Hiroyoshi Matsumura, Saitama; Hiroaki Inoue, Hachioji; Tadashi Fukuzawa, Tokyo; Naoki Chinone, Chofu, all of Japan

[73] Assignee: Hitachi, Ltd., Tokyo, Japan

[21] Appl. No.: 112,494

[22] Filed: Oct. 26, 1987

[30] Foreign Application Priority Data

Oct. 29, 1986 [JP] Japan ............................ 61-255649
Feb. 12, 1987 [JP] Japan ............................ 62-18203

[51] Int. Cl.$^4$ ............................................. G02F 1/015
[52] U.S. Cl. ................................ 350/96.14; 350/355; 357/17; 357/30; 372/45
[58] Field of Search ............... 350/353, 354, 355, 356, 350/357, 96.13, 96.14, 96.15; 357/16, 17, 30; 372/26, 45

[56] References Cited

U.S. PATENT DOCUMENTS

| | | | |
|---|---|---|---|
| 4,093,344 | 6/1978 | Damen et al. | 350/353 X |
| 4,099,854 | 7/1978 | Decker et al. | 350/354 X |
| 4,525,687 | 6/1985 | Chemla et al. | 357/16 X |
| 4,626,075 | 12/1986 | Chemla | 350/354 |
| 4,639,075 | 1/1987 | Salour et al. | 350/96.15 X |
| 4,685,763 | 8/1987 | Tada et al. | 350/96.14 |
| 4,693,547 | 9/1987 | Soref et al. | 350/96.13 |
| 4,700,353 | 10/1987 | Van Gieson et al. | 372/26 |
| 4,705,361 | 11/1987 | Frazier et al. | 350/355 |
| 4,716,449 | 12/1987 | Miller | 357/30 |

Primary Examiner—John D. Lee
Attorney, Agent, or Firm—Antonelli, Terry & Wands

[57] ABSTRACT

An optical device utilizes a polariton substance and utilizes the absorption wavelength band of excitonic polaritons. Further, an external stimulus such as electric field, magnetic field, stress, current or electromagnetic wave (light) is continuously or intermittently given to the polariton substance, thereby to modulate light which enters the optical device. Thus, a modulating operation of ultra-high speed is possible.

22 Claims, 5 Drawing Sheets

OPTICAL MODULATING DEVICE UTILIZING POLARITON SUBSTANCE

BACKGROUND OF THE INVENTION

1. Field of the Invention:

The present invention relates to an optical device. More particularly, it relates to a novel optical device which is well suited for application to the field of optical information transmission (especially, optical communication) wherein an optical signal to be transmitted depending upon the ON/OFF or intensity of light is modulated by controlling it by means of an external factor such as light, electric field, magnetic field, stress or current.

2. Description of the Related Art:

As optical modulation devices, there have heretofore been known an optical modulation device which utilizes the electrooptic effect of an $LiNbO_3$ dielectric (ROD C. Alferness, IEEE Journal of Quantum Electronics, Vol. QE-17, No. 6, pages 946-957 (June, 1981)) and an optical modulation device of the type applying an electric field, which utilizes the Franz-Keldysh effect of GaAs (T. H. Wood et al; IEEE Journal of Quantum Electronics, Vol. QE-21, No. 2, pages 117-118 (February, 1985)).

Such prior-art optical modulation devices utilizing the electrooptic effect and the Franz-Keldysh effect require voltage application magnitudes which are as high as 10 V–50 V, and they are difficult of converting high-speed signals into optical signals. Moreover, they are incapable of optical modulation of very high speed which the present invention realizes.

There has also been proposed an optical gate device wherein light is turned ON or OFF with the light itself by utilizing the excitonic absorption of a quantum well structure (J. L. Jewell et al, Appl. Phys. Lett., Vol. 46 (10), (May, 1985) pages 918-920).

Even the optical device utilizing the excitonic absorption, however, exhibits as long a switching time as 5 nsec and cannot be used as an optical switching device of ultra-high speed.

SUMMARY OF THE INVENTION

The first object of the present invention is to provide an optical device of ultra-high speed operation.

Another object of the present invention is to provide an optical device easy of modulation control.

Still another object of the present invention is to provide an optical device of simple structure.

In order to accomplish the aforementioned and other objects, the optical device according to the present invention utilizes the excitonic polariton of a semiconductor.

In more detail, the present invention consists in an optical device in which the crystal of a substance (polariton substance) having the property that when equiphase monochromatic light within a polariton resonance wavelength region incides thereon, the crystal emits monochromatic lights having different phases and being identical in wavelength to the incident light without anisotropy, is subjected to, e.g., the projection of light, the application of an electric field, a magnetic field or a stress, or the injection of current, whereby the optical characteristic of the crystal is controlled to effect optical modulation, optical switching or the like. By the way, the incident light may be any desired light.

The present invention consists in the methods and the construction hereinafter fully described, illustrated in the accompanying drawings, and set forth in the claims hereto appended, it being understood that various changes in the operation, form, proportion and minor details of construction, within the claims, may be resorted to without departing from the idea of the invention or sacrificing any of the advantages thereof.

Many other features, advantages and additional objects of the present invention will be clearly understood from the following detailed description and the accompanying drawings.

DETAILED DESCRIPTION OF THE PREFERRED EMBODIMENTS

The expression "excitonic polariton" signifies an exciton (a quasi-particle in which an electron and a hole are coupled and which behaves like a hydrogen atom) in a semiconductor and a photon that are coupled with each other. The excitonic polariton corresponds to the state in which the process that the photon excites a polarized wave termed the exciton, while the exciton becomes extinct to create the photon, repeatedly arises within the semiconductor.

Figure 1:
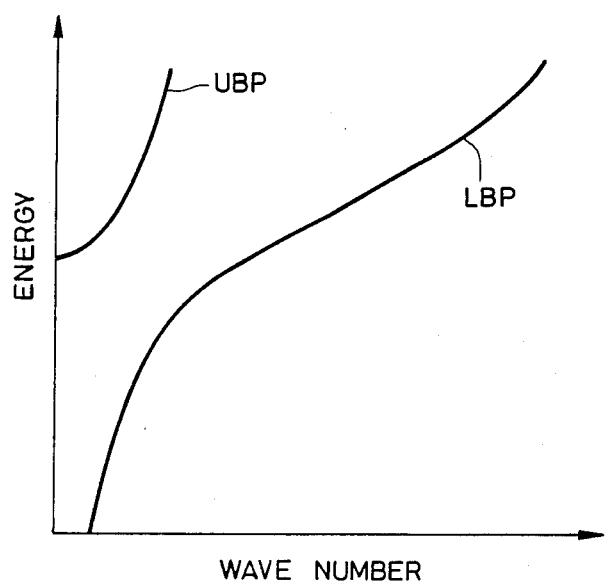
FIG. 1 is a graph showing the dispersion relation of excitonic polaritons in a semiconductor.

The relation between the energy and wave number of the excitonic polaritons (hereinbelow, simply termed "polaritons"), namely, the dispersion function of the polaritons can assume two energy values for an identical wave number as shown in FIG. 1, unlike that of ordinary quasi-particles. This comes from the fact that the polaritons have a spatial distribution. In the two dispersion curves of the polaritons, the polaritons of higher energy are called "upper branch polaritons (UBP)," and those of lower energy "lower branch polaritons (LBP)."

Figure 2:
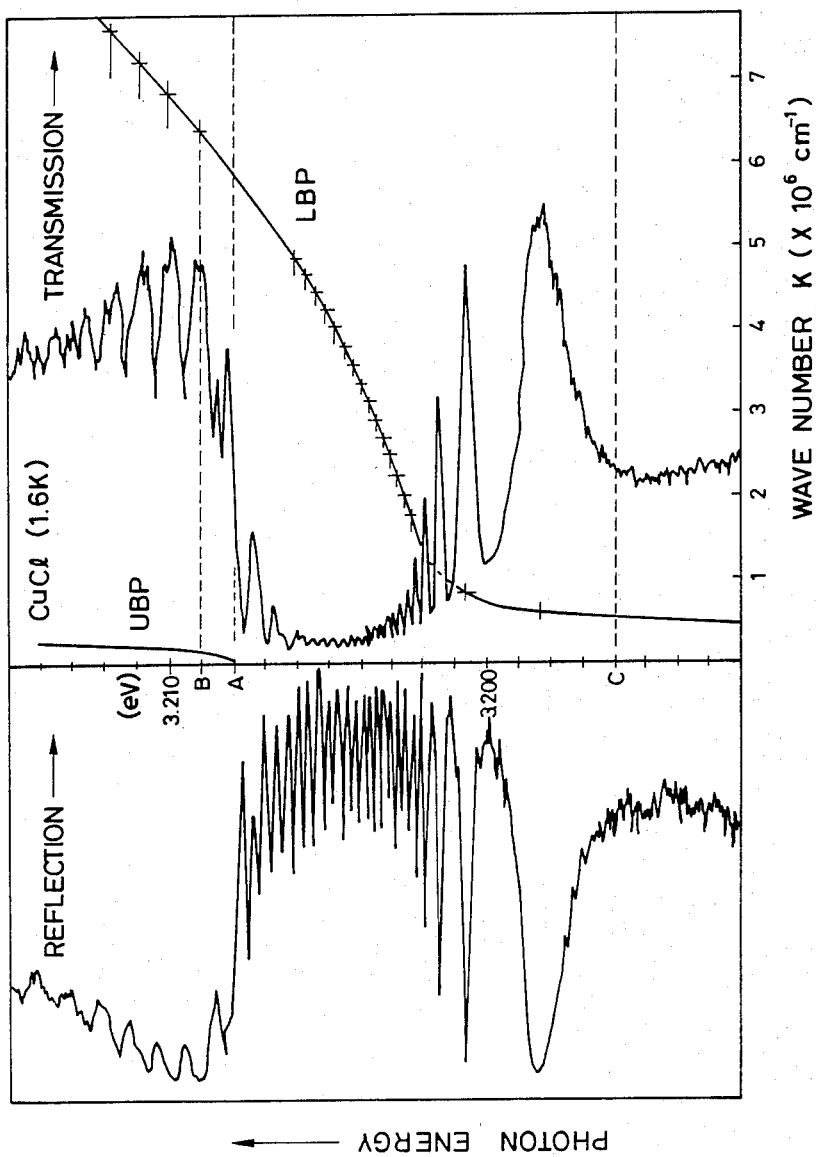
FIG. 2 is a graph showing the absorption and reflection spectra of excitonic polaritons.

When energy above a point A shown in FIG. 2, for example, equiphase light having a wavelength at a point B is caused to impinge on a substance (polariton substance) having polaritons based on excitons, light having resonated with the upper branch polaritons and light having resonated with the lower branch polaritons emerge in different phases. In this case, the directions in which the lights emerge are not specified, but the lights emerge in all directions.

Regarding the polariton substance having such a property, the transmission factor and the reflection factor depend greatly on wavelengths and vibrate for lights of the wavelengths within a wavelength region having energy greater than a point C (polariton resonance absorption wavelength region) as illustrated in FIG. 2 (T. Mita et al, Solid State Communications, Vol. 44, No. 7, (1980), pages 1003–1006).

The vibrating forms of the transmission factor and reflection factor fluctuate greatly by perturbing the crystal. The perturbation is the projection of light or the application of a voltage, current, magnetic field or stress.

Accordingly, optical devices such as an optical modulation device, an optical switch and a semiconductor laser can be constructed by utilizing this phenomenon.

The properties and phenomena based on the polaritons depend on the temperature at which the substance exists. In case of a superlattice, they depend also on the layer structure thereof.

Moreover, since the phenomena are ones of very high speed, all the operations of the aforementioned optical devices proceed at ultra-high speeds within 10 GHz.

The optical characteristics of the polariton substance represented by the light transmission factor, reflection factor and refractive index are changed by an external stimulus such as light, electric field, magnetic field, stress or current. The present invention makes use of this fact. The polariton substance is, for example, CuCl, a GaAs/GaAlAs superlattice, or InP/InGaAsP.

Incidentally, known methods are applicable as a method of applying the electric field, magnetic field or stress or injecting the current and a method of controlling the optical characteristic on the basis of the application or injection.

The polaritons as stated above are generated by irradiating the semiconductor with intense light (electromagnetic wave).

Besides, whether or not the properties of the polariton substance described above are possessed can be found using known optical measurement techniques.

The layer thickness of the optical device may be, at least, greater than approximately the wavelength of the incident light.

An especially preferable aspect of the present invention is as follows: In a device capable of utilizing the induced absorption of polaritons within a semiconductor, light energy which is greater than the lowest energy of the upper branch ones of the polaritons and which is less than 100 meV is employed as modulation control light.

Figure 3:
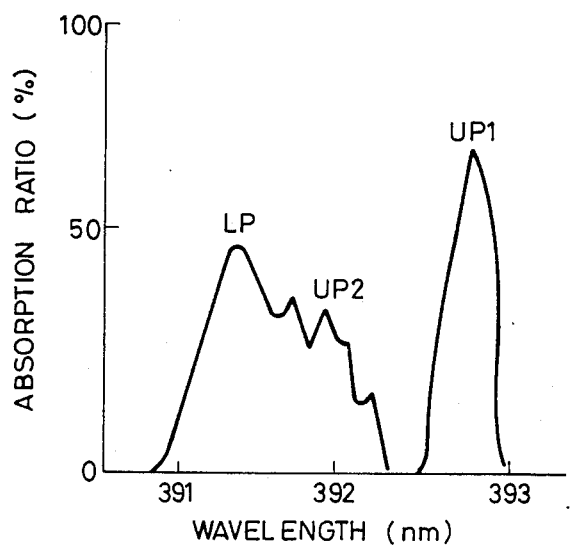
FIG. 3 is a graph showing induced absorption in CuCl.

Here, when intense light whose energy is somewhat higher than energy $h_{WL}$ owned by the upper branch polariton of zero wave number is caused to enter the semiconductor, the induced absorption arises as illustrated in FIG. 3. An absorption curve in the figure indicates an experimental result on CuCl, and expresses the absorption immediately after the entry of the intense light. As seen from FIG. 3, an intense absorption band (UP1) appears near a wavelength of 392.8 nm. This absorption band completely disappears after 2 ps. Accordingly, when light having the same wavelength as that of this absorption band is transmitted through the semiconductor and the semiconductor is irradiated with intense excitation light while emergent light is being monitored the monitor light is absorbed at ultra-high speed, and when the irradiation with the excitation light is stopped, the monitor light begins to be transmitted at ultra-high speed. The time constant of the ON/Off of the light has been experimentally found to be within 2 ps.

Such light absorption will develop on the basis of a mechanism to be stated below: When light of energy $h_{wo}$ enters the semiconductor, the upper branch polariton is generated, and light of energy corresponding to the transition from this upper branch polariton to an exciton molecule is absorbed. This corresponds to the absorption near 392.8 nm in FIG. 3. The absorption becomes extinct as soon as the generated upper branch polaritons are relaxed, so that the time constant of the absorption is very short and is theoretically conjectured to be 150 fs.

In addition, absorptions LP, UP2 etc. shown in FIG. 3 are absorptions induced by the relaxation of the upper branch polaritons, and the time constants of the attenuations thereof are as great as approximately 1 ns.

The optical gate circuit according to the present invention exploits the phenomena stated above, and is capable of switching at a time constant of or below 1 ps.

The material of the optical gate circuit according to the present invention may be any material adapted to create polaritons. Also for the device thereof, it suffices that two lights (one of which is excitation light or control light and the other of which is signal light) can be caused to impinge on an identical part. As a method of causing the two lights to impinge on the identical part, either an optical waveguide or spatial propagation may be employed.

Further, the present invention is characterized in that the energy of the excitation light is greater than $h_{wo}$ and is never less than the same and that it is effective up to, at most, $h_{wo} + 100$ meV. The reason is that, when the energy of the excitation light exceeds this value, the relaxation time of the polaritons increases under the influence of phonons.

In this manner, light having the wavelength of the absorption band shown in FIG. 3 is used as the signal light, and the excitation light is continuously or intermittently projected on the polariton substance, whereby the optical gate circuit performing the ultra-high speed operation can be realized.

The aspect of the present invention, however, is not restricted thereto. Light having any desired wavelength may be used as the signal light, which can be modulated by subjecting the polariton substance to a controlling external stimulus, for example, light (not restricted to the excitation light), heat, an electric field, a magnetic field or a stress.

Now, the preferred embodiments of the present invention will be described.

EXAMPLE 1

Figure 4:
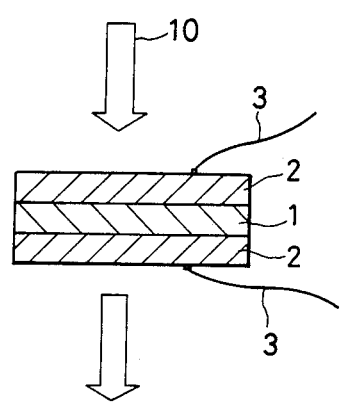
FIG. 4 is a view showing an optical modulation device of the type applying an electric field, according to an embodiment of the present invention.

Reference will be had to FIG. 4. There was fabricated a device (5 mm in length×5 mm in width) in which a semiconductor thin film 1 was made of a CuCl crystal and was 0.15 μm thick, and transparent thin films 2 made of $SnO_2$ and each being 0.2 μm thick were evaporated on the upper and lower surfaces of the thin film 1. Incident light 10 having a wavelength of 387.4 nm was caused to enter the device perpendicularly thereto by an excimer laser. On this occasion, the device was held at a temperature of 1.6° K. by the use of a liquid-He Dewar flask. When, under this state, a voltage of 0.1 V was applied across the transparent thin films 2 through leads 3, a transmission factor of 80% before the application changed to 10%, and emergent light 11 optically modulated was obtained. In addition, it was found that the modulation was possible up to a modulation rate of 15 Gbits/s.

EXAMPLE 2

A semiconductor thin film 1 was made of GaAs, and was 0.2 μm thick. Transparent electrodes 2, etc. were formed as in Example 1. The wavelength of incident light was 817.9 nm from a dye laser, and the temperature of the device was held at 4° K. by the use of a liquid-He Dewar flask. Optical modulation on this occasion was the change of the transmission factor from 80% to 20% with a voltage of 0.2 V. Besides, it was verified that the modulation rate was possible up to 10 Gbits/s.

EXAMPLE 3

Even when a superlattice of GaAs/AlGaAs was employed as a semiconductor thin film, effects similar to those of Examples 1 and 2 were attained. Herein, incident light used was light of a wavelength of 790 nm from a dye laser.

EXAMPLE 4

Although the transmitted light was used in each of Examples 1-3, similar effects were attained with reflected light. A modulation degree on this occasion was the change of a reflection factor from 30% to 60%.

EXAMPLE 5

The following table lists modulation schemes proved, together with modulation degrees (ON/OFF ratios of lights) and modulation rates.

| Material | Modulation Scheme | Modulation Degree | Modulation Rate |
|---|---|---|---|
| GaAs | Application of Magnetic field (10 gauss) | 4:1 | 10 Gbits/s |
| " | Application of Stress ($3 \times 10^{-3}$ kg/cm$^2$) | 5:1 | 10 Gbits/s |
| " | Injection of Current (5 mA) | 6:1 | 10 Gbits/s |

EXAMPLE 6

Figure 5A:
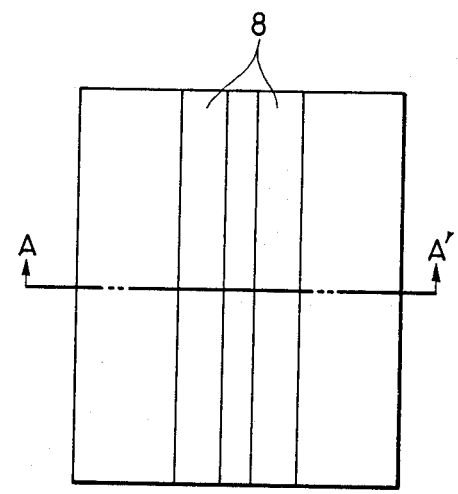
FIGS. 5A and 5B and FIGS. 6A and 6B are views showing optical switches according to embodiments of the present invention, respectively.
Figure 5B:
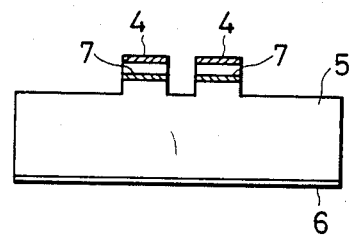

A directional coupler type optical switch having a length of 500 μm as shown in FIGS. 5A and 5B was fabricated. FIG. 5A is a plan view of the optical switch, while FIG. 5B is a sectional view taken along A—A' in FIG. 5A. Light used was one having a wavelength of 805 nm from a dye laser, and it was caused to enter one of ridges 8 through a condensing lens. Owing to such a ridge configuration, the light was confined within the ridge part and was propagated. Each of the ridges was 6 μm wide and 3 μm high. A modulating layer 7 made of a GaAs/AlGaAs quantum well structure and having a thickness of 0.2 μm as shown in FIG. 5B was provided as the intermediate layer of each ridge. Under this state, an electric field of 30 V/m was applied across electrodes 4 and 6. Thus, light having emerged from the ridge on the light entry side till then came to emerge from the opposite ridge, and an optical switching operation was verified. A quenching ratio on this occasion was 13 dB.

EXAMPLE 7

A directional coupler type optical switch having the same construction as that of Example 6 was fabricated using an InP substrate. In this case, the modulating layer 7 was formed of an InP/InGaAsP quantum well structure. The wavelength of light used was 1.3 μm. As a result, an optical switching operation at a quenching ratio of 11 dB was verified.

EXAMPLE 8

Figure 6A:
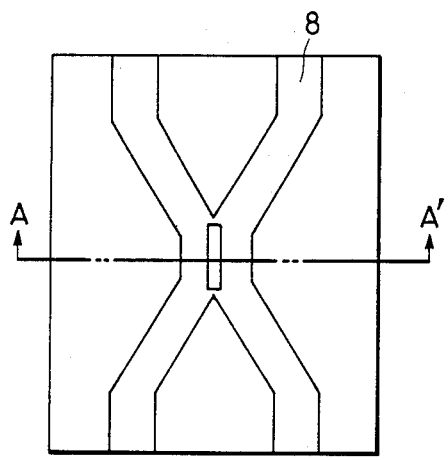
Figure 6B:
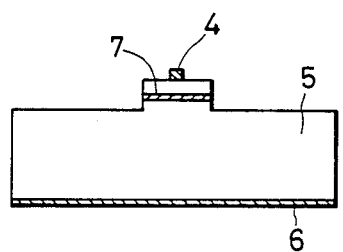

A total reflection type optical switch as shown in FIGS. 6A and 6B was fabricated. FIG. 6A is a plan view of the optical switch, while FIG. 6B is a sectional view taken along A—A' in FIG. 6A. An optical waveguide was shaped into a ridge configuration similarly to that of Example 6. An optical switching part having a sectional structure as shown in FIG. 6B was provided at the intersection part of two ridges 8. In this optical switch, for the purpose of utilizing the total reflection based particularly on lowering in a refractive index, an electrode 4 was formed narrow like a stripe as illustrated in the figures so that an electric field might act on only the central areas of the ridges.

Besides, the refractive index was changed by forming a quantum well layer of GaAs/AlGaAs as a modulating layer 7. An electric field of 40 V/m was applied across electrodes 4 and 6. As a result, an optical switching operation at a quenching ratio of 13 dB was verified by the use of light of a wavelength of 802 nm from a dye laser.

EXAMPLE 9

A total reflection type optical switch having the same construction as that of Example 8 was fabricated using an InP substrate. In this case, the modulating layer 7 was formed of a quantum well structure of InP/InGaAsP. Light used was one of a wavelength of 1.25 μm from a semiconductor laser. As a result, an optical switching operation at a quenching ratio of 12 dB was verified.

EXAMPLE 10

As the material of a device, a slice obtained by working CuCl to a thickness of 10 μm was used, and it was cooled to 2° K. This slice was irradiated as control light with a laser beam from a nitrogen-laser-excited 385.7 nm (a pulse width of 2 ps., peak power of 200 kW). The beam on this occasion was focussed into a spot 300 μm in diameter by the use of a condensing lens. Signal light from the nitrogen-laser-excited dye laser having a wavelength of 392.8 nm was caused to enter the same position as the irradiation position of the control light. Upon the irradiation with the control light, the signal light was subjected to absorption, the time constants of the rise and fall of which were confirmed to be 1 ps. or less by measurements with an autocorrelator.

EXAMPLE 11

The material of a device was a material of GaAs-type quantum well structure formed on a GaAs substrate. The well layer of the quantum well was made of GaAs and was 100 Å thick, and the barrier layer thereof was made of $Al_{0.3}Ga_{0.7}As$ and was 100 521 thick. These layers were stacked in numbers of 100 to form a multi-quantum well structure by the use of a molecular-beam evaporation apparatus. Light of a wavelength of 818 nm from a dye laser was caused to enter the thin film made of the quantum well structure, as control light. The pulse width of this light was 10 ps., and the peak power thereof was 100 kW. Light having a wavelength of 820 nm was used as signal light. When the rise and fall of the absorption of the signal light were measured with an autocorrelator, they were found to be 1 ps. or less.

EXAMPLE 12

Figure 7:
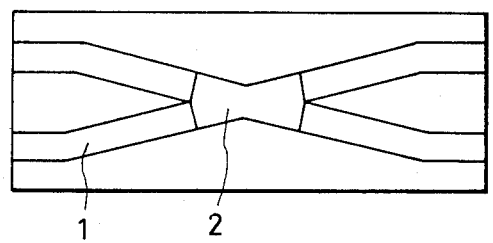
FIG. 7 is a view showing an optical gate circuit according to an embodiment of the present invention.

As shown in FIG. 7, a modulating part 2 made of a multi-quantum well structure was provided on a GaAs substrate, and two optical waveguides 1 were formed on each of sides before and behind the modulating part. The multi-quantum well structure was the same as in Example 11. Thus, control light was caused to enter one of the optical waveguides, while signal light entering the other waveguide was absorbed and modulated. The ON and OFF time constants of the modulation were 1 ps. or less.

Even when, in the above examples, the materials of the devices were replaced with Si, Ge and InP, similar results were produced. It is needless to say, however, that the absorption band wavelength and the excitation light energy differ depending upon the kinds of the semiconductor materials.

EXAMPLE 13

Figure 8A:
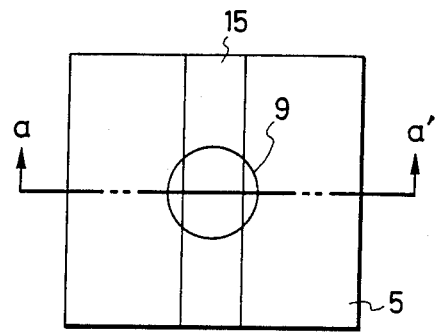
FIGS. 8A and 8B, FIG. 9 and FIG. 10 are views showing optical modulators according to embodiments of the present invention, respectively.
Figure 8B:
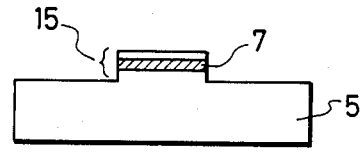

As shown in FIGS. 8A and 8B, an optical modulator including a multi-quantum well structure 7 was fabricated on a GaAs substrate 5. FIG. 8A is a plan view, while FIG. 8B is a sectional view taken along a—a' in FIG. 8A. As in Example 6, an optical waveguide 15 had a ridge configuration which was 6 $\mu$m in width and 3 $\mu$m in height. In this device, when a stress of $10^{-2}$ kg/cm$^2$ was applied within a circle indicated at numeral 9 (10 $\mu$m in diameter), light of a wavelength of 820 nm entering the optical modulator from a semiconductor laser through a condensing lens underwent intensity modulation. A modulation degree attained was about 80%. The stress may be developed by employing a needle with a flat tip 10 $\mu$m in diameter and exerting a hydrostatic pressure from above. The multi-quantum well structure 7 made of a polariton substance need not always lie over the whole surface of the ridge-shaped waveguide 15, but may lie within the circle 9.

EXAMPLE 14

Figure 9:
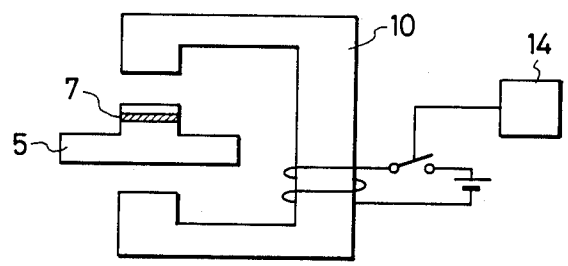

A device similar to the device of Example 13 was fabricated. The diameter of the circular part 9 (FIG. 8A) was 100 $\mu$m. A magnetic field of 50 gauss was applied normally to this circular part. Light intensity modulation at a modulation degree of about 60% was attained. As shown in FIG. 9, an electromagnet 10 was used for the application of the magnetic field. Although the illustration in FIG. 9 is schematic, switching means 14 is used for continuously or intermittently applying the magnetic field to the device so as to modulate signal light. A well-known electric element may be employed for the switching.

EXAMPLE 15

In a device which was also constructed as shown in FIGS. 8A and 8B, the circular part 9 was irradiated with modulating light (intensity: 20MW/cm$^2$) 16 at a wavelength of 800 nm. Thus, light of a wavelength of 820 nm from a semiconductor laser propagated along the optical waveguide underwent light intensity modulation at a modulation degree of about 75 %.

Figure 10:
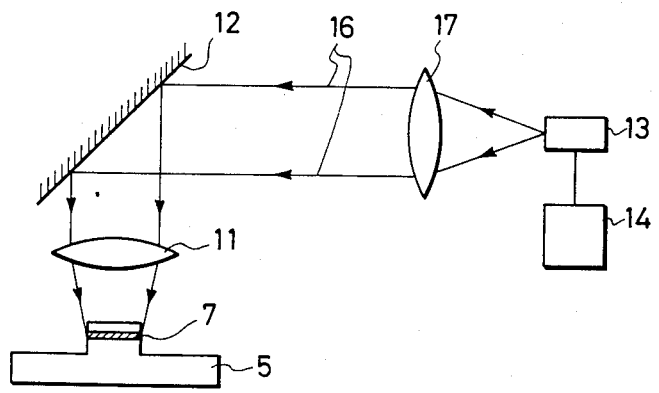

As the modulating light 16, light emitted from, for example, a dye laser 13 is projected through a mirror 12 and lenses 17 and 11 as illustrated in FIG. 10. The light 16 may well be switched by means 14 for controlling the dye laser 13.

The polariton substances which can be utilized in the present invention include, besides CuCl, direct transition type semiconductors such as GaAs, PbI$_2$, CdSe and InP. Moreover, the excitonic polariton state can be caused to stably exist by adopting a superlattice structure made of any of these materials.

What is claimed is:

1. In an optical device wherein a modulating part receives incident light to emit modulated light; an optical device characterized in that the modulating part is made of a polariton substance, to which a stimulus is externally given, thereby to modulate the incident light, the polariton substance absorbing the incident light so as to generate polaritons.

2. An optical device according to claim 1, wherein said polariton substance is an ionic semiconductor.

3. An optical device according to claim 1, wherein the external stimulus is a perturbation.

4. An optical device according to claim 3, wherein said perturbation is a dynamical perturbation.

5. An optical device according to claim 3, wherein said perturbation is an electrical perturbation.

6. An optical device according to claim 1, wherein the external stimulus is an electromagnetic wave.

7. An optical device according to claim 6, wherein said electromagnetic wave has light energy which is greater than a lowest energy of an upper branch polariton state of said polariton substance.

8. An optical device according to claim 7, wherein said electromagnetic wave has energy which is not higher than 100 meV.

9. An optical device according to claim 1, wherein said incident light has a wavelength within an induced absorption band of said polariton substance.

10. An optical device according to claim 1, wherein the modulated light is light which has been transmitted through said polariton substance.

11. An optical device according to claim 1, wherein the modulated light is light which has been reflected from said polariton substance.

12. An optical device according to claim 1, wherein said polariton substance is CuCl.

13. An optical device according to claim 1, wherein said polariton substance has a superlattice structure.

14. An optical device according to claim 13, wherein said polariton substance is made of a group-III-V compound.

15. An optical device according to claim 13, wherein said incident light propagates in a direction parallel to the direction of said super-lattice structure.

16. An optical device comprising:
   A semiconductor which exhibits induced absorption of polaritons by incident light; and
   means to modulate the incident light entering the semiconductor, by the use of modulation control light having energy that is greater than a lowest energy of an upper branch polariton state of the polaritons and that is not higher than 100 meV.

17. An optical device according to claim 16, wherein the entering light has a wavelength within a wavelength band of the induced absorption of said polaritons.

18. An optical device comprising:
   a polariton substance; and
   a pair of electrodes which are formed so as to hold the polariton substance therebetween;
   said polariton substance receiving incident light and absorbing the incident light so as to generate polaritons therein for emitting modulated light.

19. An optical device comprising:

a polariton substance having a super-lattice structure of GaAs/AlGaAs; and a pair of electrodes, at least one of which transmits light;

said polariton substance receiving incident light and absorbing the incident light so as to generate polaritons therein for emitting modulated light.

20. An optical device comprising:

ridges which guide light;

a modulating part which is provided in, at least, a part of the ridges and which is made of a polariton substance; and at least one pair of electrodes through which an electric field is applied to the modulating part;

said polariton substance receiving incident light and absorbing the incident light so as to generate polaritons therein for emitting modulated light.

21. An optical device according to claim 20, wherein said ridges construct a directional coupler.

22. An optical device according to claim 20, wherein said ridges construct a total reflection type optical switch, and said modulating part is provided in an intersection part of said ridges.

* * * * *